United States Patent [19]

Lewis et al.

[11] Patent Number: 5,355,042
[45] Date of Patent: Oct. 11, 1994

US005355042A

[54] MAGNETIC BEARINGS FOR PUMPS, COMPRESSORS AND OTHER ROTATING MACHINERY

[75] Inventors: David W. Lewis; Robert R. Humphris; Eric H. Maslen; Paul E. Allaire; Ronald D. Williams, all of Charlottesville, Va.

[73] Assignee: University of Virginia Patent Foundation, Charlottesville, Va.

[21] Appl. No.: 612,194

[22] Filed: Nov. 13, 1990

Related U.S. Application Data

[63] Continuation of Ser. No. 242,264, Sep. 9, 1988, abandoned.

[51] Int. Cl.$^5$ .................................................. H02K 5/16
[52] U.S. Cl. ................................ 310/90.5; 310/51; 310/62; 310/68 B; 324/207.25
[58] Field of Search ............... 310/90, 90.5, 62, 63, 310/65, 181, 688, 112, 114, 254, 261, 268, 51; 318/254, 607, 625; 324/207.25; 73/462; 464/180

[56] References Cited

U.S. PATENT DOCUMENTS

| | | | |
|---|---|---|---|
| 3,937,533 | 2/1976 | Weillette | 310/90.5 |
| 3,955,426 | 5/1976 | Klinchuch | 310/90.5 |
| 4,000,929 | 1/1977 | Studer | 310/90.5 |
| 4,061,043 | 12/1977 | Stiles | 310/90.5 |
| 4,180,946 | 1/1980 | Heijkenskjold | 310/90.5 |
| 4,300,807 | 11/1981 | Poubeau | 310/90.5 |
| 4,379,598 | 4/1983 | Goldowsky | 310/90.5 |
| 4,387,935 | 6/1983 | Studer | 310/90.5 |
| 4,417,772 | 11/1983 | Robinson | 310/90.5 |
| 4,438,987 | 3/1984 | Kapaan | 310/90.5 |
| 4,620,752 | 11/1986 | Fremerey | 310/90.5 |
| 4,959,568 | 9/1990 | Stokes | 310/51 |

FOREIGN PATENT DOCUMENTS

| | | | |
|---|---|---|---|
| 2825551 | 12/1979 | Fed. Rep. of Germany | 310/90.5 |
| 1382300 | 1/1975 | United Kingdom | 310/90.5 |

OTHER PUBLICATIONS

Dynamic Response of Magnetically Supported Rotor, by D. W. Lewis et al.; Univ. of Virginia, Charlottesville, Va.; Jun. 1988.
Practical Limits to the Performance of Magnetic Bearings, Peak Force, Slew Rate and Power Requirements; E. Maslen; NASA Langley, Hampton, Va.; Feb. 1988.
Practical Magnetic Bearings; H. Habermann et al.; IEEE Spectrum, vol. 16, No. 9, pp. 26–30, Sep. 1979.
Schweitzer et al., "Characteristics of a Magnetic Rotor Bearing for Active Vibration Control", IMECH E 301–306 (U.S.A. 1976).
Studer, P. A., "Magnetic Bearings for Spacecraft", IEEE Trans. Magn., Mag-7:3, 520 (U.S.A. 1971).
Burrows et al., "Vibration Control of Multi-Mode Rotor-Bearing Systems", Proc. R. Soc. London Serial A, 386:1790, 77–94 (Great Britain 1983).

*Primary Examiner*—R. Skudy
*Attorney, Agent, or Firm*—Finnegan, Henderson, Farabow, Garrett and Dunner

[57] ABSTRACT

A rotating machine having a rotor comprising a flexible shaft with a plurality of masses distributed along the shaft. Included within these masses are magnetic disks. Magnetic bearings are attached to the housing and coact to support the rotor in only a radial direction or in both radial and axial directions. Bearing sensors are used to measure the shaft position local to each bearing relative to a face of each bearing. Variable magnetic bearing parameters are controlled so as to change values of stiffness and damping of the magnetic bearings in response to the measurements from the bearing sensors. These controls can be direct analog circuitry, or digital components, or a combination of digital and analog components.

18 Claims, 4 Drawing Sheets

MAGNETIC BEARINGS FOR PUMPS, COMPRESSORS AND OTHER ROTATING MACHINERY

This application is a continuation of U.S. patent application Ser. No. 07/242,264, filed on Sep. 9, 1988, now abandoned.

BACKGROUND

Rotating machines, such as pumps and compressors, display operating characteristics which come in part from the bearing parameters. With the use of magnetic bearings, these parameters may be controlled or modified as the rotor is stationary or turning. In general, conventional fluid film bearings or so-called anti-friction bearings cannot be adjusted or modified either when the rotor is stationary nor when it is turning in the bearings. So magnetic bearings offer many advantages over the more conventional bearings.

Machinery characteristics come in part from the balance of the rotors; but even when a rotor is brought into perfect balance, other dynamic characteristics may still produce undesirable running characteristics. These latter characteristics stem from the dynamics of the system which may be described in terms of the masses and their distributions, damping properties of the materials of construction and configurations of the design, and the stiffnesses of the various components and their interactions. Included in these above noted parameters are the bearings that support the rotating elements, which taken together may be simply called the rotor.

By varying the defining parameters of the bearings, the overall system dynamics may be controlled. With magnetic bearings, these parameters may be adjusted or changed when the rotors are running; (i.e., turning within the bearings) or even when they are in support, but not turning. It is important to understand that support is not usually attained in a fluid film bearing until the rotor is turning. Such is not the case with the magnetic bearing. It may be in support whether the rotor is turning or not.

Many special features may be designed into a magnetic bearing. It is some of the unique features that are addressed in this invention, including the isolation or "canning", the support system, special speed dependent parameters, special controls for hybrid bearings, and balancing without turning of the rotor.

SUMMARY OF THE INVENTION

A rotating machine is used to convert one form of energy into another as exemplified by an electric motor, with the input energy being electricity, and the output energy form being torque at some speed. Conversely, torque at some speed may be the input energy form; and electricity, defined by a voltage and a current, might be the output form, as in the case of an alternator or generator.

In any rotating machine, the turning elements, otherwise defined as the rotors, must be physically separated from the non-turning or stationary elements, defined as the stators, to prevent damage either to the rotors or the stators. This separation is accomplished by use of bearings which may act, not only in a radial direction; that is, perpendicular to the essential axis about which turning occurs, but also in the axial direction; that is, along the axis about which turning occurs. This invention addresses these elements, defined as bearings. The most common bearings are fluid film bearings, in which control of a rotor relative to a stator is through a thin film of some type fluid, and so called anti-friction bearings in which balls, cylinders, or frustoms of circular cones permit controlled motion of specially shaped rings, one of which is fastened to the stator and the other joined to the rotor.

The bearings of this invention are magnetic, by which the stator and rotor are caused to be separated by use of magnetic flux fields arranged in such a manner as to attract the rotor to the stator by electromagnetic fields; and controlled in both the radial and axial directions, so as to prevent contact between the rotor and stator.

The basic elements of a rotating machine are noted in FIG. 1. The rotor includes a multiplicity of masses distributed along a flexible shaft, or in some designs the flexible shaft is replaced by a series of equivalent rings or cylinders that connect the masses to one another. The individual magnetic bearings are arranged to carry either radial loads or axial loads, or both; and are attached to the stator, or what is frequently called the frame or housing of the machine. In addition, most designs call for some type of back-up bearing, such as 5, 6, or 19 that comes into service when the rotor is not turning and the magnetic bearings are not activated or in the situation in which the rotor motion becomes large and contact is likely to occur between the rotor and stator. "Large" motion means a few thousandths of an inch as the space or clearance between the face of a magnetic bearing, which is attached to the housing, and the rotor element adjacent to the face is typically a few thousandths of an inch, and contact between these two areas is not desirable.

Control of a magnetic bearing requires knowing the relative position of the rotor and the face of the magnet. This is determined by some type of bearing sensor, exemplified by 7, 8, and 9 in FIG. 1. In general, each magnetic bearing, whether radial or axial, will require a bearing sensor. Through the relative position, as detected by the bearing sensor, control of the rotor relative to the stator or housing 21 is maintained by an electronic control circuit which varies the current in the magnet; and in turn, the flux generated by the magnet, and hence the attractive force between the magnets and the adjacent rotor element.

One feature of this invention is the encapsulation of the magnetic bearings into the housing or frame such as 21, with the prime mover, such as motor 14. An example of this would be a pump exemplified by impeller 17 contained within, the housing in which an electric motor is also contained. In this manner, the system; that is, a motor plus pump plus bearings, would require no seals to prevent the fluid, being pumped, from leaking out of the housing. This is in contrast to a conventional system in which a pump, with seals, is connected to a motor, also having seals, with each of the seals being a point in the design at which failure is likely to occur. This encapsulation offers the advantage of avoiding seals, avoiding conventional bearings which have limited life, and reducing the power dissipated by the action of the seals. The canned pump design described by this invention may use a prime mover other than an electric motor, such as an air turbine or other device. The advantage of using magnetic bearings is still attained, because the entire unit, prime mover plus driven unit plus bearings, may all be contained in a leak-proof vessel or housing, thereby avoiding a seal that would otherwise be required.

A yet additional feature of this invention arises from the subtle use of the controls for the magnetic bearing in a manner additional to that of just supporting of the rotor. By this means, a rotating field can be superimposed on the other wise controlled field used to support the rotor. FIG. 2 shows an end view of rotor 1, i.e., looking axially along the geometric axis of the rotor. In this case, four electromagnets are depicted as composing the radial magnetic bearing, although the number may be three or more magnets, depending upon the designer and the control circuit employed. By superimposing a small field that sequentially moves from magnet 22 to 23 to 24 to 25 and then repeats itself, and detecting through the bearing sensors the small motion of shaft 27 that results from this rotating field, through the bearing sensors, certain information may be deduced about the rotor. Specifically, the influence coefficients may be determined, which are mathematical quantities useful for understanding and predicting the dynamic behavior of the rotor. In addition, the rotor may be balanced from the measurements of this response to a rotating field, without the rotor turning. This is to say that the rotor may be brought into support through the use of the magnetic bearings, then the rotating field is superimposed on the support field, and the unbalance of the rotor is ascertained from the mathematical manipulation of the results of this rotating field, and the response is detected by the bearing sensors.

A further additional feature of this invention results from the specific addition of permanent magnets to the electromagnets. By specific design means, the permanent magnets may be employed in a manner in which no overlapping of the flux fields of the permanent and electromagnets occurs. Accomplishing this without additional axial enlargement of the system results in a less expensive design, one with higher critical speeds, and lower power requirements of the power supply. This specific design does require a specific controller due to the interdependence of the electromagnets.

The analog switches 92 are connected to the control system analog inputs and outputs 94. An additional feature of this invention rests with the use of digital controls both for control flexibility and to produce a fault tolerant system. The significant advances in electronic components now allows for the design of a system that can monitor itself while handling the basic function of acting as a magnetic bearing controller. As depicted in FIG. 3, a hierarchical controller 80 is divided into functions. At the lower level are found redundant digital controllers A, B, C, D, and E, referred to collectively as the conventional sensors (not shown in FIG. 3) and control lines and power system analog inputs and outputs 94 that are connected to electromagnets, and also to the bearing position sensors. At this level, also, is analog input/output bus 90 that permits any one particular sensor line, or any one control line to be switched to and be under the control of any particular controller. This is accomplished through the use of a system coordinator 82, which acts as a high level controller acting through system data and control bus.

The advantages of this hierarchical circuit design are many, including the means for switching from one controller to another, when one shows signs of deterioration. This means that the system coordinator may call upon any one controller, such as Controller in FIG. 3, to control more than one electromagnet in the bearing. In this manner, the System Coordinator can make known to an operator that some type of circuit failure has occurred; and which particular controller has the failure, while at the same time the bearing system continues to function with active control maintained. The operator could then remove the particular board having component failure and replace it with a good board. At that instant, the System Coordinator will be sensing the presence of the new board and when declared acceptable, will switch the new board into functioning (as contrasted with testing) use thereby relieving the multiplexing function that had previously been attached to one of the other Controllers, such as D.

Another advantage of the hierarchical circuit design is in its ability to implement the rotating field test, described above, for the use of balancing. This means that balancing may be accomplished as the rotor is turning; or more specifically, the amount of unbalance of the rotor can be ascertained as the rotor is turning. With the System Coordinator functioning, a change of unbalance can be used to again alert an operator that a machine is degrading for some reason; and the amount of degradation can be quantified through this means.

Another feature of this invention is that it provides the means to determine experimentally the mode shapes of a rotor. While in support, but not turning, the rotor may be excited through the magnetic bearings. Then with a single probe, scanning along axially, or a series of fixed probes distributed axially, the radial displacements due to the exciting forces induced by the bearing or bearings can be sensed; and from the readings, the mode shapes can be ascertained. The mode shapes are important for predicting the overall dynamic response of the rotor to any particular type of excitation to which the rotor may be subjected during turning.

The results from the above described tests can be used to deduce the amplification factor of a rotor system. This means that the overall damping of the system can be determined, including that combined structural damping of the rotor plus the dynamic damping supplied by the magnetic bearings. The latter quantity is adjustable through the controls of the magnetic bearings; and by being able to determine the combined damping of the system, an optimum amount of damping may be set through bearing control algorithms.

DETAILED DESCRIPTION OF INVENTION

The interaction of the many components that compose a rotating machine must be comprehended in order to understand this invention. A general description of the components is given in FIG. 1 in which a flexible shaft 1 forms the backbone of the rotor. As noted previously, this flexible shaft may not be singled out in a particular system as a single element, but its equivalent will be identifiable mathematically even though it may be executed in hardware as a series of shells or tapered wheels or a combination of short spacers, wheels, cones, and stubs or shafts coupled together via threaded pieces and or bolts. Whatever forms this element, its importance cannot be over stated in the dynamic behavior of the rotating system.

Figure 1:
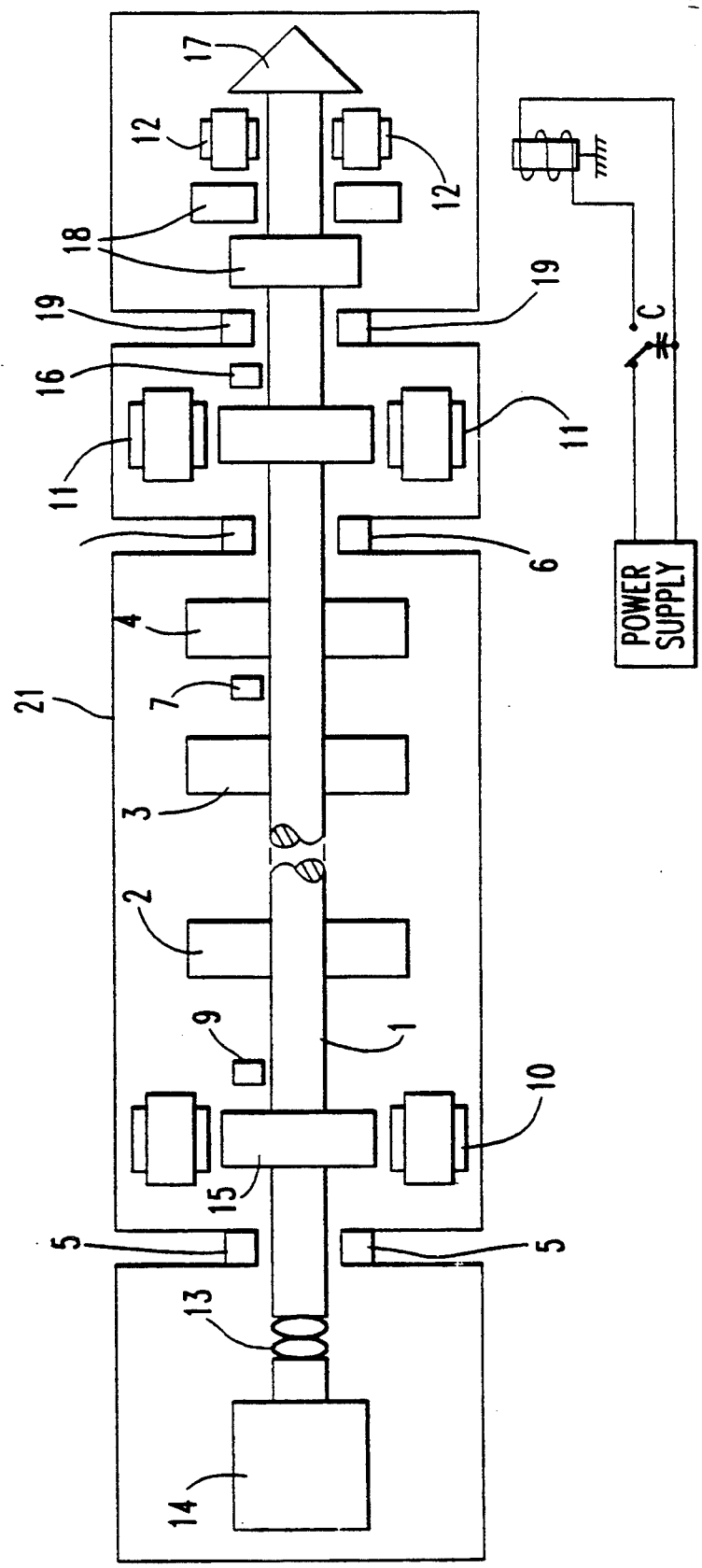
FIG. 1 is an illustration of one embodiment of the rotating machine of the present invention.

Some form of prime mover such as motor 14 will drive the system, that is, cause the rotor to turn about the axis generally described by the flexible shaft 1 of FIG. 1. The prime mover may have a coupling 13 or be solidly affixed to the flexible shaft 1, which in this latter case will contribute in the dispersion of equivalent rotating masses 2, 3, 4 which in themselves may number thirty or more elements. For example, the bearing disks 15, 16, the thrust collar 18, the impeller 17 may be identified as additional shaft masses, or may in themselves be further delineated into several mathematical elements for more detailed prediction of the dynamic response of the system. FIG. 1 shows a radial magnetic bearing 10 toward one end of the flexible shaft, a second radial magnetic bearing 11 at another location along the shaft, and an axial or thrust carrying magnetic bearing 12 located either near one of the radial bearings, or at some other convenient location along the shaft. Each of the magnetic bearings is attached to the stator 21 of the machine frequently known as the housing or otherwise known as the frame of the machine. For each bearing some form of bearing sensors 7, 8, 9 is required to measure the position of the shaft local to each bearing relative to the face of each bearing. Each of bearing sensors 7 and 8 measure the shaft position in two mutually perpendicular directions each of which is in a radial sense.

Part of the rotor in FIG. 1 is the impeller 17, which in some machines may be identified as compressor or other terminology. In the case of large vibrations, motion of the rotor is limited by radial backup bearings 5, 6 and axial backup bearing 19. These may be some type of anti-friction bearing or special plated surfaces or special elements designed to support the turning rotor for a limited period of time.

All of the turning components described in FIG. 1 taken together define the rotor whose dynamic action is to be controlled through the magnetic bearings. It is this rotor that is contained in the housing and may be "canned" by the housing without the requirement of seals, which are normally necessary to separate conventional bearings from the rotor and the housing. Because no physical contact is required between the housing and the rotor when employing magnetic bearings, the rotor and magnetic bearings may be canned together, thereby avoiding seals and special lubricating fluids that would otherwise be needed for the operation of the conventional type bearing. This is one major advantage of this invention.

Another advantage of this canned magnetic bearing design lies in the fact that the major elements of the bearing, the electromagnets, are fixed with respect to the housing. This permits the use of shielding either to protect the electromagnets from other magnetic flux fields or to isolate the electromagnets, especially when they are being pulsed for testing purposes, thereby preventing unwanted radiation from permeating the area adjacent to them.

The dynamic characteristics of a machine are defined by the rotor configuration, which includes all of the masses and the flexible shaft, plus the bearings that support the rotor plus the effect of the housing. With magnetic bearings, the stiffnesses and damping qualities may be varied even as the bearing is in operation. As the overall dynamic behavior of the machine stems in large part from the dynamic behavior of the rotor as supported by the bearings, the changing of the bearing parameters, stiffness and damping factors, implies control of the dynamic behavior of the machine. In particular, certain frequencies of the turning motion of a rotor produce unusual and usually undesirable motions. These frequencies are called "critical speeds" and may be changed by changing the Eigenvalues of the overall system. These Eigenvalues are related to the stiffness and damping parameters of the bearings so that by controlling the magnetic bearing parameters, the overall dynamic behavior of the machine may be controlled.

One portion of this invention is in the means for attaining the control of the magnetic bearing parameters, stiffness and damping factors, as previously defined. One means of implementation of the control of the bearing parameters is by direct analog circuitry in which the amplification or gains of the bearing parameters are switched from one value to another in a prescribed fashion, in which the prescription is based solely on the turning speed of the rotor.

For example, as the turning speed of the rotor increases, the speed will approach one of the "critical speeds" of the system. With the prescription method, the bearing parameters would be adjusted in a manner to move the nearest "critical" away from the turning speed, say by increasing the "critical". Then upon further increase in the turning speed of the rotor, the "critical" would be approached again; and this time the prescription would shift the magnetic bearing parameters to drop the "critical" below the turning speed. The turning speed sensor would be an analog device providing an analog signal to initiate the switching prescription or algorithm just described.

Another means of implementing the algorithm for the magnetic bearing parameter adjustments is through a hybrid circuitry, in which most of the control circuitry is by analog means, but the prescription which would shift the magnetic bearing parameters is implemented by the use of digital potentiometers that are switching according to the turning speed which is indicated by digital means. These digital potentiometers are part of the gain control of the stiffness and damping factors so they directly vary the magnetic bearing parameters.

A yet further means for implementing the gain control for the bearing parameters, stiffness and damping, is via an all digital control system. By this means a computer is employed for the overall control of the magnetic bearing so that implementation of the control algorithm is through a software program that is directing the computer. The use of an all digital control allows the convenient implementation of some additional desirable features of this invention and they will be described in detail. However, the use of the digital micro computer offers much flexibility in implementing very complex control algorithms for changing the bearing parameters. This means that it is possible to employ an adaptive algorithm through use of the computer. Such an algorithm can take the amplitude of vibration of the rotor at one or more positions, as determined by the bearing sensors and any auxiliary sensors employed for this purpose, and increase or decrease the stiffness and/or damping of each bearing in a progressive manner; and then on the basis of the measured vibration level of the rotor, continue changing the parameter in the same direction. Upon determining that the rotor vibration is becoming worse rather than better, the computer control algorithm will reverse the direction of change of the bearing parameters simultaneously monitoring the total vibration level so as to bring the vibration level to a minimum. This adaptive control feature is implementable through the use of the digital computer and permits an optimum setting for the magnetic bearing parameters, even in the case of major change of unbalance of the rotor. The unbalance of a rotor can change through loss of a blade or erosion or buildup of material on an element composing the rotor.

To summarize, the implementation of bearing parameter control may be through an all analog circuit, a hybrid circuit, or an all digital circuit. The control of the magnetic bearing parameters, stiffness and damping factors, provides the means for improving the operating characteristics of a machine by reducing the vibration level of the rotor.

Figure 2:
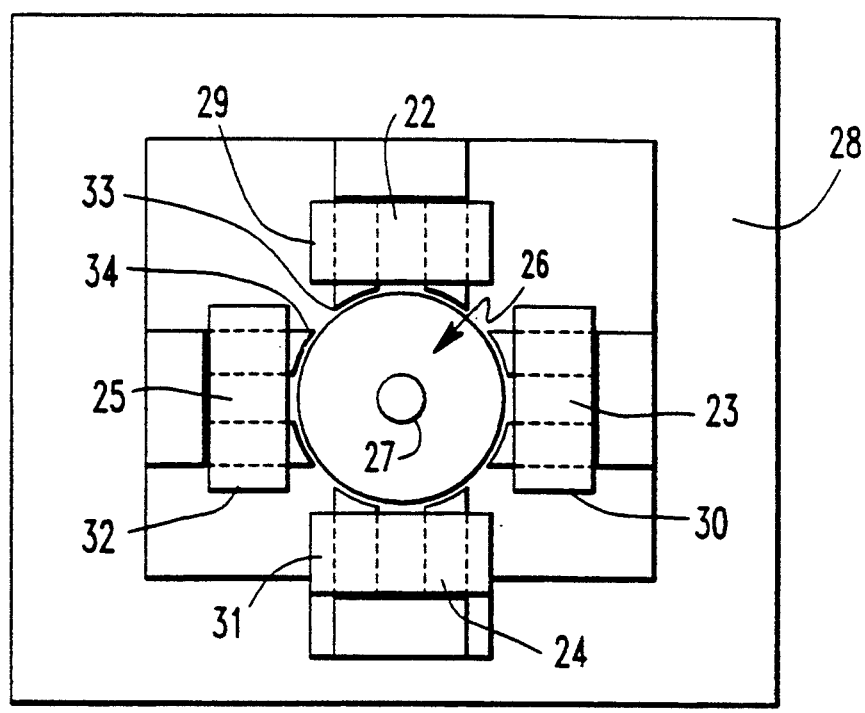
FIG. 2 is a sectional view taken across the axis of a rotor showing one form of magnetic bearing.
Figure 3:
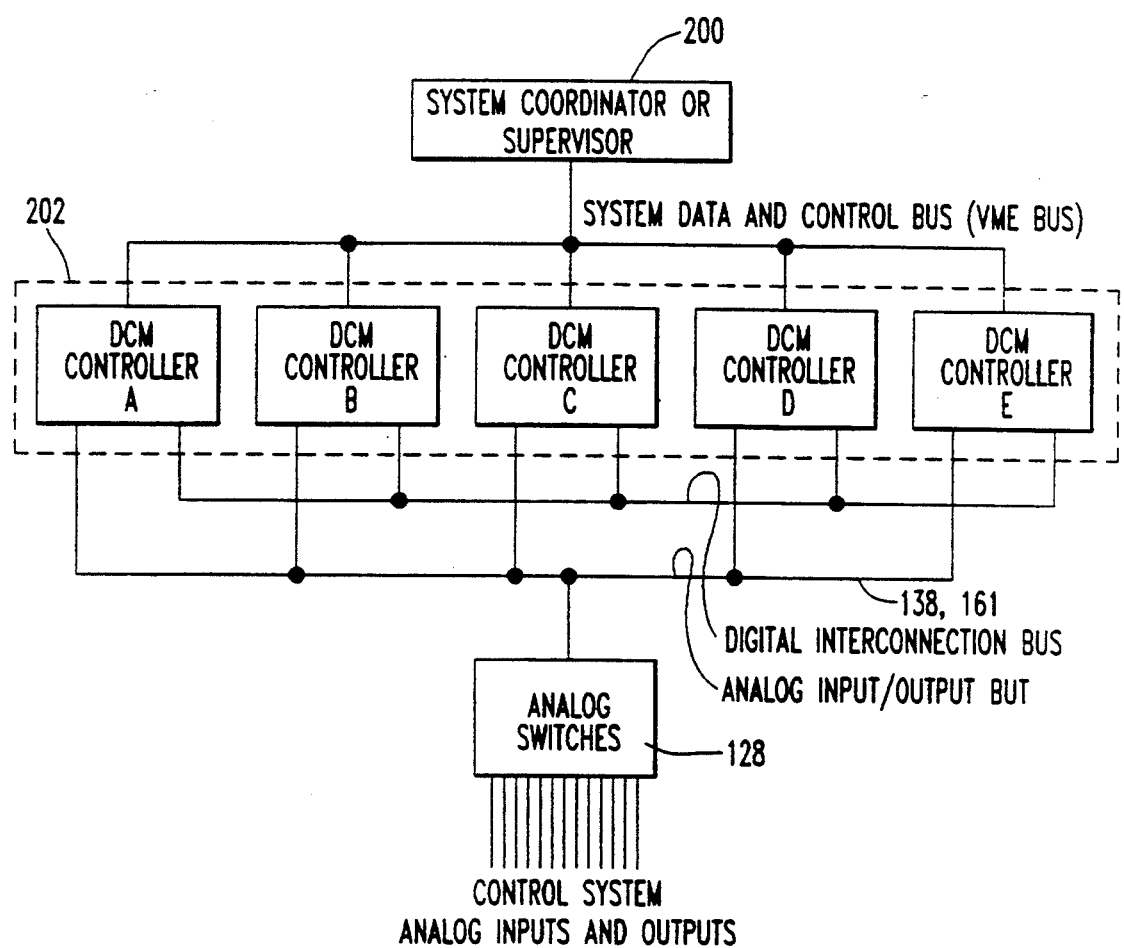
FIG. 3 is a block diagram of a control computer system.

FIG. 2 is a section taken across the axis of a rotor showing one form of magnetic bearing. It depicts four horseshoe shaped electromagnets 22, 23, 24, 25 each having a coil 29, 30, 31, 32 for producing a flux field that passes through the iron of the electromagnet and through the disk 26 that is attached to the shaft 27 of the rotor. Each electromagnet is attached to the housing 28. One face 33 of electromagnet 22 is noted indicating a clearance 34 between the face and magnetic disk 26. This clearance is of the order of several thousandths of an inch making it clear that no physical contact occurs between the disk and the face. As pictured in FIG. 2, passing an electrical current through the coil 29 of electromagnet 22 will produce an attractive force between the disk 26 and electromagnet 29 tending to lift the shaft upward. Similarly, driving coil 30 of magnet 23 will produce a force acting on the shaft generally toward the right. So with proper controls activating the several independent coils singly or in a prescribed manner, the shaft may be caused to move in any radial direction while simultaneously being constrained by forces proportional to a radial displacement, known as bearing stiffness, and at the same time being subjected to forces also in the radial direction that are proportional to the instant radial velocity, known as bearing damping. The totality of these separate forces produced by the combination of the four electromagnets shown in FIG. 2, or more electromagnets as can be visualized by anyone familiar with the art, is determined by the control circuitry and in the case of the digital controllers, the computer software employed.

It should be noted, that even though no physical contact occurs between the rotor and the housing, the dynamics of the rotor are prescribed by the rotor configuration, the rotor masses and shafting form, coacting with the electromagnets. And because the electromagnets are under control of the designer, the dynamic behavior of the machine is also under control of the designer. This is one major advantage of this invention. It provides direct control of the machine dynamics; and more importantly, control after the machine hardware has been assembled. The same magnetic bearings that support the rotor offer the means for running certain tests on the machine when the rotor is brought into support, whether or not the machine is turning.

Testing and Balancing

For a rotor in magnetic bearings, certain types of testing can be done that are specifically limited to the support means. From FIG. 2, it is obvious that the circumferential arrangement of the magnets offers the means for superimposing a rotating electric field onto the rotor. One can visualize increasing the voltage of coil 29, of FIG. 2, then dropping that voltage while simultaneously increasing the voltage to coil 30 then repeating the process for coils 31 and 32 and then repeating the cycle. The generation of this rotating field will produce a small rotating radial force to act upon the shaft 27 at whatever frequency that is selected for the rotating field. Depending upon the frequency selected, the response of the rotor will be made up of a weighted sum of the mode shapes excited. Viewed in another way, this means that the rotor mode can be excited singly by tuning the frequency of the rotating field to the specific associated mode. Thus two pieces of information are produced by use of this rotating field, the determination of the critical speeds of the rotor and the mode shapes, which also implies the determination of the location of the nodal points of the rotor. As before, the determination of these data may be accomplished with or without the rotor turning. Applying this varying sinusoidal field to the thrust or axial magnet coil 30 of FIG. 2, would similarly allow the determination of the critical speed, if any, of the actual direction of the rotor.

From the previous description, it is apparent that a rotating field acts on the shaft in the same manner as an unbalance force. For those versed in the art of balancing a rotor, it becomes obvious that the rotating electric field applied to the magnet coils can be related to what is known as a "trial weight" which is applied to a rotor as a means of determining the influence coefficients of the rotor. By changing the phase of the rotating electric field relative to a specific position on the shaft, a series of trial weights may be added sequentially to the rotor and the responses measured by the bearing sensors from which data the location and the amount of unbalance in the rotor may be ascertained. What this implies is that one feature of this invention is a balancing machine that is an integral part of the magnetic bearing suspension system for the rotor, and it is a system that can be brought into activation as frequently as is desired. So during the operation of the rotor system as a machine, a pump or compressor or whatever it has been designed for, it may be tested, as though it had been removed from its foundation, for the amount of the unbalance; and if it proves to be changing too significantly, then the rotor system can be scheduled for maintenance and rebalanced.

A yet further facet of this invention is the means for determining the cross-coupling that exists with rotors and is very difficult to measure. However, with the rotor in support through activation of the magnetic bearings, a vertical exciting force may be applied to the shaft through use of electromagnet 22 and electromagnet 24 by alternately superimposing a small current onto the main support current. By measuring the horizontal motion that occurs at each magnetic bearing, via the bearing sensor, resulting from the vertically applied force, the cross-coupling terms may be ascertained for the rotor system. The cross-coupling values are significant when describing the overall stability of the rotor system, i.e., the likelihood of it not running above a certain turning speed without large vibration amplitudes.

In like manner, it is clear that the application of an oscillating force, acting in a radial direction with respect to the axis of the shaft, in any set of magnets with the measurement of the displacement response of the rotor in a direction perpendicular to the oscillating force will be a measure of the cross-coupling of the rotor system. This invention provides the means to determine the cross-coupling through direct application of the controls for applying the oscillating forces of known value and the bearing sensors providing a direct measurement of the displacements, the ratio of these said values and displacements being made either by a hand calculator or through an electronic circuit as available with a computer, the ratios so obtained being the cross-coupling terns for the particular rotor system.

This same procedure or technique may also be employed to determine the cross-coupling between the various perpendicular directions at opposite ends of the rotor.

Permanent Magnets

One feature of this invention makes use of permanent magnets in a unique design that provides the bias flux for the electromagnets, and within the design does not require that the flux from the electromagnets pass through the permanent magnets. By this means, a more efficient design is possible which means that less power is required for the electromagnets.

Figure 4:
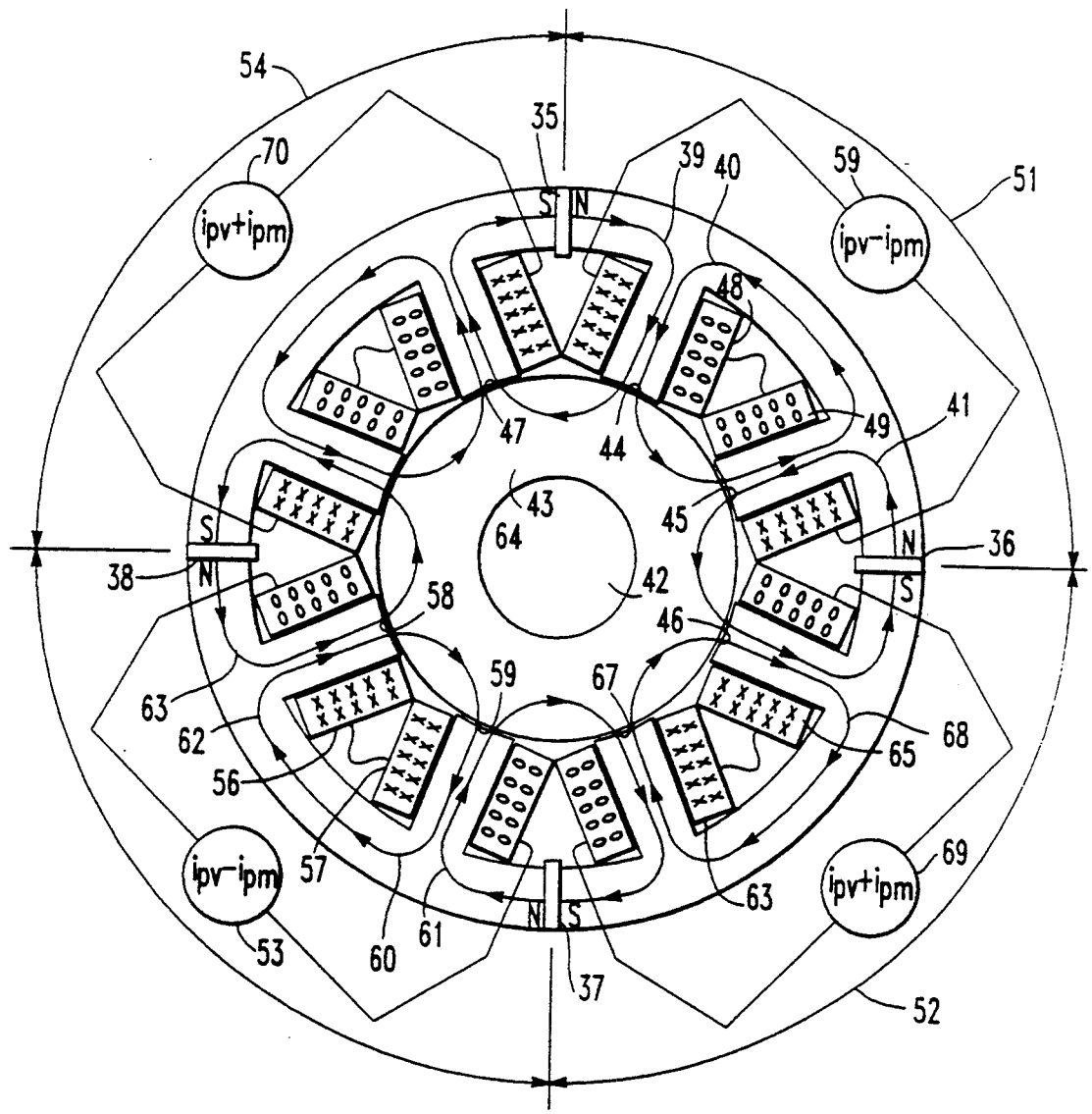
FIG. 4 shows a cross-sectional view of a rotor.

FIG. 4 is a cross-section of a rotor showing a flexible shaft 42, iron disk 43, through which the magnetic fields pass coming from both the permanent magnets as well as the electromagnets. FIG. 4 shows the special relationship of permanent magnets 35, 36, 37, 38 and other geometric components. In this figure, electromagnet coils 48, 49 produce a field described by magnetic path 40 showing faces 44, 45 through which the field acts to attract the disk 43. Acting in the same quadrant is the permanent magnet 35 with the magnetic path 39 which acts through faces 44, 47 and attracts the disk 43 generally upward as viewed in FIG. 4. Note in particular that the magnetic path 40 makes use of iron in such a manner that it does not have to pass through permanent magnet 35. Similar statements may be made regarding the other quadrants of this hybrid magnetic bearing.

The electromagnets acting directly in the upper right-hand quadrant 51 see electrical currents 50 which produce forces at the faces 44, 45 whose vector sum acts at an angle of 45 degrees from a vertical line defined by the position of magnets 35, 37. Simultaneously, the permanent magnet 35 produces attractive forces acting generally upward through the faces 44, 47 with a vector sum acting vertically upward passing through the shaft center 64 through the magnet 35. At the same time the permanent magnet 36 produces attractive forces on the disk 43 through fluxes passing through the faces 45, 46 said forces summing vectorily in the general horizontal direction acting to the right from the shaft center 64 through the permanent magnet 36. The sum of the vector sums of the three forces just described act in a manner to attract the disk 43 radially outward and generally up and to the right of FIG. 4.

Considering the electromagnet coils 65, 66 of FIG. 4, the current 69 will produce the flux path 68 which will yield attractive forces through faces 46, 67 generally attracting the disk 43 downward and to the right as viewed in FIG. 4. It is clear that by controlling the currents 50, 69 and the strength of the permanent magnets 35, 36, 37 the attractive forces sum acting on the disk 43 can be directed in any direction pointing from the shaft center 64 into quadrants 51, 52. Continuing the analysis into quadrant 53 and in consideration of the electromagnet coils 56, 57 and the permanent magnets 37, 38 it should be apparent that attractive forces may be applied to the disk 43 acting in a direction acting generally downward and to the left as viewed in FIG. 4. And one further consideration of the magnets in quadrant 54 should make it clear that forces can be applied to the disk 43 in any arbitrary direction.

Further consideration of the coaction of all of the electromagnets and permanent magnets of FIG. 4 should reveal the fact that not only may forces act in any arbitrary direction on disk 43 but that they may act in pairs in opposite directions. So it is clear that the paired interaction of the forces in any arbitrary direction signals the fact that the equivalent spring constant of the flexible shaft 42 in any radial direction may be controlled through the electronic controllers which set the currents 50, 69, 55, 70. So not only may this bearing support a rotor system, it may be employed to superimpose radial forces which are rotating clockwise or counterclockwise as in the view of FIG. 4. Further, it should be also apparent that through the programming of the forces, superimposed on the rotor supporting forces, that the equivalent of unbalance forces can be added to the rotor system. This is to make clear that the degree of unbalance in the rotor system can be ascertained even as the rotor is turning, and at the same time other tests can be run. These tests include the determination of the influence coefficients for the rotor system, the cross-coupling of the system, and even the degradation that might be occurring in the system due to erosion, build-up of material on the rotating elements of the rotor, or partial failure and loss of some components.

One further point of interest relates to the controllers used with the bearing system described in FIG. 4. The flux from permanent magnet 36 is in the same sense through face 46 as the flux produced by the current 69 in the coils 65, 66. Simultaneously, the flux from this same permanent magnet 36 is in the opposite sense through face 45 as produced by the coils 48, 49. The conclusion is clear, namely, that the controllers employed in this bearing are radically different from those that would be required for the see geometrically similar bearing but with the permanent magnets removed. This unique circuitry is a preferable feature of this invention.

Another unique feature of this invention comes from the geometry described by FIG. 4 in which it becomes clear that because the flux paths of the electromagnets do not pass through the permanent magnets, certain advantages occur. The bearing is easy to construct as there are no contorted shapes required for the magnet iron as the flux paths are simple and clear. Secondly, the simple geometry yields a design that physically shorter than would be required if the iron required for the magnetic flux paths were contorted in the axial direction; that is, in a direction perpendicular to the section of FIG. 4.

It should be noted that the face area 44 would not necessarily be equal to the face area 59. The legs, with faces 44, 59 carry different resultant fluxes and would not need be the same for the most efficient use of the material. Further, although the coils are shown as regular cylinders, other shapes taking advantage of the volumes immediately adjacent to the coils as noted in FIG. 4 can yield a more tightly filled magnet coil, and therefore, be more efficient regarding the space available, hence more efficient from a load carrying viewpoint. This particular geometry is for illustrative purposes to indicate how the flux paths can be optimized to avoid having the flux path of an electromagnet pass through any permanent magnet.

Having described our invention we claim:

1. A rotatable machine comprising:
   a housing;

11 a rotor disposed within the housing having a plurality of masses and a shaft means including a flexible shaft with an axis, wherein the plurality of masses are distributed axially along the shaft means and included within the masses are magnetizable disks;

a prime mover connected to the shaft means of the rotor;

at least one magnetic bearing mounted to the housing including a plurality of electromagnets and permanent magnets coacting to support the rotor in a radial direction; each electromagnet having a face and generating a flux field having a path extending normal to the axis of the shaft means, each permanent magnet being disposed between predetermined ones of the electromagnets such that each of the flux paths do not pass through the permanent magnets;

sensing means for measuring a position of the shaft means local to said at least one magnetic bearing and relative to the face of each of the plurality of electromagnets; and control means including direct analog circuitry for controlling variable magnetic bearing parameters which can change values of stiffness and damping of the at least one magnetic bearing in response to measurements from the sensing means.

2. The machine of claim 1, wherein the rotor is further comprised of backup bearings which limit motion of the rotor.

3. The machine of claim 1, wherein the rotor, the prime mover, the at least one magnetic bearing, and the sensing means, are all contained within the housing.

4. The machine of claim, wherein no overlapping occurs between flux fields of the permanent and electromagnets.

5. The machine of claim 1, wherein the control means include digital components.

6. The machine of claim 1, wherein the plurality of electromagnets coact with the magnetizable disks to support the rotor in a radial direction.

7. The method of balancing a rotatable rotor supported by radial magnetic bearings comprising the steps of:

(a) superimposing an electrical signal on the magnetic bearings which produces a radial force, wherein the electrical signal sweeps through a frequency range which includes at least one critical speed of the rotor;

(b) detecting motion that results from the superimposed electrical signal through bearing sensors;

(c) asserting unbalance of the rotor from mathematical manipulation from results of the superimposed electrical signal and a response as detected by the bearing sensors; and (d) balancing the rotor with said electrical signal in response to said asserted unbalance.

8. The method of claim 7, wherein the rotor is in a state of turning about its major axis.

9. The method of claim 7, wherein the rotor is not in a state of turning but is supported through activation of said radial magnetic bearings, from which is deduced the at least one critical speed of the rotor supported by the magnetic bearings.

10. The method of claim 7, wherein the superimposed electrical signal is caused to oscillate in a radial direction across an axis of the rotor, and produces an oscillating force to act upon the rotor, and wherein a displacement response of the rotor is measured in a direction perpendicular to the direction of the oscillating force, therein determining a cross-coupling of the rotor by calculating a ratio of the oscillating force to the displacement response.

11. The method of claim 7 wherein the superimposed electrical signal is a rotating field.

12. A rotatable machine, comprising:

a stator;

a rotor, including a plurality of masses and shaft means rotatable on an axis, the plurality of masses including a magnetizable disk;

a prime mover attached to the shaft means at one end;

an impeller attached to the shaft means axially spaced from the prime mover;

a magnetic bearing mounted to the stator, the magnetic bearing including a plurality of electromagnets for coacting with the magnetizable disk to support the rotor, each of the plurality of electromagnets having a radially extending spaced projection with a face, each projection having a wound coil means for producing a flux field passing from a corresponding projection to the magnetizable disk through an air gap between a corresponding projection face and the disk, the magnetic bearing including a plurality of substantially equi-spaced permanent magnets disposed between a predetermined number of the spaced projections and radially outward from corresponding faces of the spaced projections, the plurality of electromagnets and permanent magnets being disposed relative to one another to generate non-overlapping flux fields between the permanent magnets and electromagnets, said flux fields extending in a plane normal to the axis of shaft means rotation, the rotor, the prime mover, the magnetic bearings, the shaft means, and the impeller being contained within a housing;

sensing means for measuring a position of the shaft means relative to the face of each of the spaced projections; and control means for controlling variable parameters of the magnetic bearing for changing values of stiffness and damping of the magnetic bearing in response to measurements from the sensing means.

13. The machine of claim 12, wherein the rotor is further comprised of backup bearings which limit at least one of axial motion and radial motion of the rotor.

14. A rotatable machine comprising:

a housing;

a rotor disposed within the housing having a plurality of masses and a shaft means having an axis, wherein the plurality of masses are distributed axially along the shaft means and included within the masses are magnetizable disks;

a prime mover connected to the shaft means of the rotor;

at least one magnetic bearing mounted to the housing including at least four horseshoe shaped electromagnets and a plurality of permanent magnets coacting to support the rotor in a radial direction, each electromagnet having a face and generating a flux field having a path normal to the axis of the shaft means, each permanent magnet being disposed between predetermined ones of the electromagnets wherein the flux paths do not pass through the permanent magnets, each electromagnet having a coil means for producing a flux field that passes through a respective electromagnet and through a corresponding magnetizable disk, wherein no physical contact occurs between the disk and the corresponding face of the respective electromagnet;

sensing means for measuring a position of the shaft means local to said at least one magnetic bearing and relative to the face of each of the plurality of electromagnets; and control means including direct analog circuitry for controlling variable magnetic bearing parameters which can change values of stiffness and damping of the at least one magnetic bearing in response to measurements from the sensing means.

15. A rotatable machine, comprising:

a stator;

a rotor, including a plurality of masses and shaft means rotatable on an axis, the plurality of masses including a magnetizable disk;

a magnetic bearing mounted to the stator, the magnetic bearing including a plurality of electromagnets for coacting with the magnetizable disk to support the rotor, each of the plurality of electromagnets having radially extending spaced projection with a face, each projection having wound coil means for producing a flux field passing from a corresponding projection to the magnetizable disk through an air gap between the corresponding projection face and the disk; the magnetic bearing including a plurality of substantially equi-spaced permanent magnets disposed between a predetermined number of the spaced projections and radially outward from corresponding faces of the spaced projections, the plurality of electromagnets and permanent magnets being disposed relative to one another to generate non-overlapping flux fields between the permanent magnets and electromagnets, said flux fields extending in a plane normal to the axis of shaft means rotation;

sensing means for measuring a position of the shaft means relative to the face of each of the spaced projections; and control means having direct analog circuitry for controlling variable parameters of the magnetic bearing for changing values of stiffness and damping of the magnetic bearing in response to measurements from the sensing means.

16. A rotatable machine comprising:

a housing;

a rotor disposed within the housing having a plurality of masses and a shaft means having an axis, wherein the plurality of masses are distributed axially along the shaft means and included within the masses are magnetizable disks;

a prime mover connected to the shaft means of the rotor;

at least one magnetic bearing mounted to the housing including a plurality of electromagnets and permanent magnets coacting to support the rotor in a radial direction, each electromagnet having a face and generating a flux field having a path extending normal to the axis of the shaft means, each permanent magnet being disposed between predetermined ones of the electromagnets such that each of the flux paths do not pass through the permanent magnets;

sensing means for measuring a position of the shaft means local to said at least one magnetic bearing and relative to the face of each of the plurality of electromagnets; and control means including direct analog circuitry and a combination of digital and analog components for controlling variable magnetic bearing parameters which can change values of stiffness and damping of the at least one magnetic bearing in response to measurements from the sensing means.

17. A rotatable machine, comprising:

a stator;

a rotor, including a plurality of masses and shaft means, the shaft means including a flexible shaft rotatable on an axis, the plurality of masses including a magnetizable disk;

a magnetic bearing mounted to the stator, the magnetic bearing including a plurality of electromagnets for coacting with the magnetizable disk to support the rotor, each of the plurality of electromagnets having a radially extending spaced projection with a face, each projection having wound coil means for producing a flux field passing from a corresponding projection to the magnetizable disk through an air gap between the corresponding projection face and the disk, the magnetic bearing including a plurality of substantially equi-spaced permanent magnets disposed between a predetermined number of the spaced projections and radially outward from corresponding faces of the spaced projections, the plurality of electromagnets and permanent magnets being disposed relative to one another to generate non-overlapping flux fields between the permanent magnets and electromagnets, said flux fields extending in a plane normal to the axis of shaft means rotation;

sensing means for measuring a position of the shaft means relative to the face of each of the spaced projections; and control means for controlling variable parameters of the magnetic bearing for changing values of stiffness and damping of the magnetic bearing in response to measurements from the sensing means.

18. A rotatable machine, comprising:

a stator;

a rotor, including a plurality of masses and shaft means rotatable on an axis, the plurality of masses including a magnetizable disk;

a magnetic bearing mounted to the stator, the magnetic bearing including a plurality of electromagnets for coacting with the magnetizable disk to support the rotor, each of the plurality of electromagnets having a radially extending spaced projection with a face, each projection having a wound coil means for producing a flux field passing from a corresponding projection face to the magnetizable disk through an air gap between the corresponding projection face and the disk; the magnetic bearing including a plurality of substantially equi-spaced permanent magnets disposed between a predetermined number of the spaced projections and radially outward from corresponding faces of the spaced projections, the plurality of electromagnets and permanent magnets being disposed relative to one another to generate non-overlapping flux fields between the permanent magnets and electromagnets, said flux fields extending in a plane normal to the axis of shaft means rotation;

sensing means for measuring a position of the shaft means relative to the face of each of the spaced projections; and control means including a combination of digital and analog components for controlling variable parameters of the magnetic bearing for changing values of stiffness and damping of the magnetic bearing in response to measurements from the sensing means.

* * * * *

UNITED STATES PATENT AND TRADEMARK OFFICE
CERTIFICATE OF CORRECTION

PATENT NO. : 5,355,042
DATED : October 11, 1994
INVENTOR(S) : DAVID W. LEWIS ET AL.

It is certified that error appears in the above-indentified patent and that said Letters Patent is hereby corrected as shown below:

Claim 4, column 11, line 33, after "claim" insert insert --1,--.

Claim 12, column 12, line 35, change "bearings" to --bearing--.

Claim 15, column 13, line 22, before "radially" insert --a--.

Signed and Sealed this

Thirteenth Day of December, 1994

Attest:

BRUCE LEHMAN

*Attesting Officer*  *Commissioner of Patents and Trademarks*